United States Patent
Geeurickx et al.

(10) Patent No.: US 10,023,667 B2
(45) Date of Patent: Jul. 17, 2018

(54) PROPYLENE HOMOPOLYMER FOR HIGH-TENACITY FIBERS AND NONWOVENS

(71) Applicant: TOTAL RESEARCH & TECHNOLOGY FELUY, Seneffe (BE)

(72) Inventors: Peter Geeurickx, Dilbeek (BE); Alain Standaert, Brussels (BE); Jean-Luc Zuliani, Genappe (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 728 days.

(21) Appl. No.: 14/410,982

(22) PCT Filed: Jun. 27, 2013

(86) PCT No.: PCT/EP2013/063457
§ 371 (c)(1),
(2) Date: Dec. 23, 2014

(87) PCT Pub. No.: WO2014/001425
PCT Pub. Date: Jan. 3, 2014

(65) Prior Publication Data
US 2015/0376307 A1 Dec. 31, 2015

(30) Foreign Application Priority Data
Jun. 27, 2012 (EP) .................. 12173751

(51) Int. Cl.
| | | |
|---|---|---|
| *C08F 110/06* | (2006.01) |
| *C08L 23/12* | (2006.01) |
| *D01D 5/12* | (2006.01) |
| *D01D 10/02* | (2006.01) |
| *D01F 6/06* | (2006.01) |
| *B29C 47/00* | (2006.01) |
| *D04H 1/4291* | (2012.01) |
| *B29K 23/00* | (2006.01) |
| *B29L 7/00* | (2006.01) |

(52) U.S. Cl.
CPC ........ *C08F 110/06* (2013.01); *B29C 47/0014* (2013.01); *B29C 47/0057* (2013.01); *B29C 47/0059* (2013.01); *C08L 23/12* (2013.01); *D01D 5/12* (2013.01); *D01D 10/02* (2013.01); *D01F 6/06* (2013.01); *D04H 1/4291* (2013.01); *B29K 2023/12* (2013.01); *B29K 2995/0077* (2013.01); *B29L 2007/008* (2013.01); *C08L 2205/025* (2013.01)

(58) Field of Classification Search
CPC .. C08F 110/06; C08L 23/12; C08L 2205/025; B29C 47/0014; B29C 47/0057; B29C 47/0059; D01D 5/12; D01D 10/02; D01F 6/06; B29K 2023/12; B29K 2995/0077; B29L 2007/008; D04H 1/4291
See application file for complete search history.

(56) References Cited

U.S. PATENT DOCUMENTS

| | | | |
|---|---|---|---|
| 6,586,531 B2 * | 7/2003 | Washiyama | C08L 23/12 525/191 |
| 2003/0055173 A1 * | 3/2003 | Obata | C08J 5/18 525/240 |

FOREIGN PATENT DOCUMENTS

| | | |
|---|---|---|
| EP | 0361493 A1 | 4/1990 |
| EP | 0728769 A1 | 8/1996 |
| EP | 2070956 A1 | 6/2009 |
| EP | 2305723 * | 4/2011 |
| EP | 2305723 A1 | 4/2011 |

OTHER PUBLICATIONS

G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, n° 4, Jul.-Aug. 1977, p. 773-778.
2nd World Congress of Chemical Engineering, Montreal, Canada, 6, 373 (Oct. 4-9, 1981).
Plastics Additives Handbook, ed. H. Zweifel, 5th edition, 2005, Hanser Publishers.
Polypropylene Handbook, ed. Nello Pasquini, 2nd edition, Hanser, 2005, pp. 397-403.
International Search Report issued in International Application No. PCT/EP2013/063457, dated Jul. 26, 2013 (2 pages).

* cited by examiner

*Primary Examiner* — Cephia D Toomer
(74) *Attorney, Agent, or Firm* — Albert Shung

(57) ABSTRACT

Propylene homopolymers having a melt flow index in the range from 3.0 dg/min to 8.0 dg/min can be particularly suited for high-tenacity fibers and yarns and nonwovens. The propylene homopolymers can be produced by a process that can include polymerizing propylene in presence of a Ziegler-Natta polymerization catalyst, an aluminum alkyl, hydrogen and an optional external donor.

21 Claims, No Drawings

PROPYLENE HOMOPOLYMER FOR HIGH-TENACITY FIBERS AND NONWOVENS

CROSS REFERENCE TO RELATED APPLICATIONS

This application is a National Stage Entry of PCT/EP2013/063457, filed on Jun. 27, 2013, which claims priority to European Patent Application No. 12173751.4, filed on Jun. 27, 2012.

FIELD OF THE INVENTION

The present invention relates to propylene homopolymers having a melt flow index in the range from 3.0 dg/min to 8.0 dg/min that are particularly suited for high-tenacity fibers and yarns and nonwovens. Further the present invention relates to a process for the production of such propylene homopolymers.

The Technical Problem and the Prior Art

The combination of mechanical and physical properties together with good processability and good economics have made polypropylene the material of choice for a large number of fiber and nonwoven applications, such as for construction and agricultural industries, sanitary and medical articles, carpets, textiles. In recent years high-tenacity fibers and nonwovens for use for example in agriculture or in the automotive industry are one of the applications that has attracted special attention. In general high-tenacity fibers can be defined as having a tenacity of at least 45 cN/tex.

Depending upon the processing methods used in the production of such fibers and nonwovens the requirements for the polypropylene can differ widely, such as for example the melt flow. The polypropylenes used for fibers and nonwovens generally have a melt flow index in the range from 3 dg/min for very strong high-tenacity fibers up to several thousand dg/min for meltblown nonwovens.

High-tenacity fibers may be produced by melting a polypropylene in an extruder and extruding the molten polypropylene through the fine capillaries of a spinneret to obtain filaments. These filaments are then cooled and thus solidified. In order to increase the tenacity, the solidified fibers are reheated, drawn at elevated temperature and finally annealed. In general it is observed that the tenacity of the fibers increases with increasing draw ratio. However, the increase in tenacity is accompanied by a decrease in elongation. This leads to fibers that have high tenacity but because of being too rigid are unable to absorb energy and therefore tend to break easily. To avoid these problems desirable fibers should have a tenacity at max of 45 cN/tex or higher and an elongation at break of 55% or more, better of 65% or more, in order to be well suited for high tenacity fibers and nonwovens.

Producers of high-tenacity fibers and nonwovens are therefore interested in new propylene polymers that allow an increase in tenacity without a corresponding loss in elongational properties.

It is therefore an object of the present invention to provide propylene polymers allowing the production of fibers with increased tenacities, or with good elongational properties, or preferably with both.

An additional object of the present invention is to provide propylene polymers characterized by good processability in fiber spinning and nonwoven production.

BRIEF DESCRIPTION OF THE INVENTION

We have now discovered that at least one of the above objectives can be met by providing a propylene homopolymer comprising at least two propylene homopolymer fractions of different melt flow index, wherein the ratio of the melt flow index of the fraction with the highest melt flow index and the melt flow index of the fraction with the lowest melt flow index is in the range from 3 to 400, said propylene homopolymer being characterized by
- a melt flow index in the range from 3.0 to 8.0 dg/min (measured according to ISO 1133, condition L, 230° C., 2.16 kg),
- a xylene solubles content in the range from 1.5 wt % to 3.5 wt %,
- a tacticity in the range from 97.0% to 99.0% of mmmm pentads (determined on the insoluble heptane fraction of the xylene insolubles fraction), and
- a recovery compliance in the range from $4.0 \cdot 10^{-4}$ Pa$^{-1}$ to $5.5 \cdot 10^{-4}$ Pa$^{-1}$.

The present invention also provides a process for the production of propylene homopolymers as defined in the present invention, said process comprising the step of
(a) polymerizing propylene in presence of a Ziegler-Natta polymerization catalyst, an aluminium alkyl, hydrogen and an optional external donor,
wherein the propylene homopolymer comprises at least two propylene homopolymer fractions of different melt flow index (measured according to ISO 1133, condition L, 230° C., 2.16 kg), wherein the ratio of the melt flow index of the fraction with the highest melt flow index and the melt flow index of the fraction with the lowest melt flow index is in the range from 3 to 400.

Further, the present invention provides fibers, yarns and nonwovens made with such propylene homopolymers as well as a process for their production.

DETAILED DESCRIPTION OF THE INVENTION

For the purposes of the present invention the terms "fiber" and "filament" are used interchangeably.

For the purposes of the present invention the terms "polypropylene" and "propylene polymer" are used interchangeably.

We have now discovered that at least one of the objectives mentioned above can be met by providing propylene homopolymers having a melt flow index (MFI) in a well-specified range and a broad molecular weight distribution in combination with other well-defined properties relating to the structure of the propylene polymers.

The propylene homopolymers of the present invention have a melt flow index (MFI) of at least 3.0 dg/min, preferably of at least 3.5 dg/min, more preferably of at least 4.0 dg/min, even more preferably of at least 4.5 dg/min, still even more preferably of at least 5.0 dg/min, and most preferably of at least 5.5 dg/min. The propylene homopolymers of the present invention have a melt flow index (MFI) of at most 8.0 dg/min, preferably of at most 7.5 dg/min, more preferably of at most 7.0 dg/min, and most preferably of at most 6.5 dg/min. The melt flow index is determined as indicated in the test methods.

Further, the propylene homopolymers of the present invention are characterized by a xylene solubles content in the range from 1.5 wt % to 3.5 wt %, preferably in the range from 2.0 wt % to 3.0 wt % and most preferably in the range from 2.3 wt % to 2.8 wt %. The xylene solubles content is determined by dissolving the polypropylene in refluxing xylene, cooling the solution to 25° C., filtering the solution, and subsequent evaporation of the solvent. The residue, which is the xylene soluble portion of the polypropylene, is then dried and weighed.

The propylene homopolymers of the present invention are further characterized by a high isotacticity, for which the content of mmmm pentads is a measure. The content of mmmm pentads is in the range from 97.0% to 99.0%, preferably in the range from range from 97.2% to 98.5%, more preferably in the range from 97.2% to 98.3%. The content of mmmm pentads is determined on the heptane insoluble fraction of the xylene insoluble fraction by NMR analysis according to the method described by G. J. Ray et al. in Macromolecules, vol. 10, no 4, 1977, p. 773-778.

The propylene homopolymers of the present invention are also characterized by a recovery compliance in the range from $4.0 \cdot 10^{-4}$ Pa$^{-1}$ to $5.5 \cdot 10^{-4}$ Pa$^{-1}$, preferably in the range from $4.5 \cdot 10^{-4}$ Pa$^{-1}$ to $5.5 \cdot 10^{-4}$ Pa$^{-1}$, more preferably in the range from $4.6 \cdot 10^{-4}$ Pa$^{-1}$ to $5.4 \cdot 10^{-4}$ Pa$^{-1}$. The recovery compliance is determined using a parallel-plate rotational stress rheometer. It is defined as the recoverable strain divided by the stress applied during the test and gives an indication of the purely elastic properties of the polymer.

The propylene homopolymers of the present invention comprise at least two propylene homopolymer fractions of different melt flow index (measured according to ISO 1133, condition L, 230° C., 2.16 kg), wherein the ratio of the melt flow index of the fraction with the highest melt flow index and the melt flow index of the fraction with the lowest melt flow index is in the range from 3 to 400, preferably in the range from 5 to 200, more preferably in the range from 10 to 50 and most preferably in the range from 15 to 30. For the purpose of the present invention the term "propylene homopolymer fraction" is used to identify a propylene homopolymer that is produced under a single average hydrogen to propylene ratio in a single polymerization reactor using a Ziegler-Natta polymerization catalyst as defined in the present application.

Preferably, the propylene homopolymers of the present invention comprise at least two propylene homopolymer fractions, which, when taken together, comprise at least 90.0 wt % of the propylene homopolymer. More preferably, they comprise at least 95.0 wt % or 97.0 wt % or 99.0 wt %, even more preferably at least 99.5 wt % and still even more preferably at least 99.8 wt % of the propylene homopolymer. Most preferably the propylene homopolymer consists of the two propylene homopolymer fractions.

Preferably, the propylene homopolymers of the present invention comprise two propylene homopolymer fractions of different melt flow index (measured according to ISO 1133, condition L, 230° C., 2.16 kg), wherein the propylene homopolymer fraction with the lowest melt flow index has a melt flow index in the range from 1.0 dg/min to 2.5 dg/min, preferably in the range from 1.5 dg/min to 2.0 dg/min, and most preferably in the range from 1.6 dg/min to 1.9 dg/min.

Preferably, the propylene homopolymers of the present invention comprise at least two propylene homopolymer fractions of different melt flow index, wherein the propylene homopolymer fraction with the lowest melt flow index comprises from 55 wt % to 65 wt %, preferably from 55 wt % to 60 wt % of the propylene homopolymer.

Preferably, the melt flow index of the at least two propylene homopolymer fractions comprised in the present propylene homopolymers are chosen such that the propylene homopolymers of the present invention are characterized by a polydispersity index (PI) in the range from 4.0 to 5.5, preferably in the range from 4.5 to 5.0. The polydispersity index (PI) has first been described by Zeichner and Patel in the Proceedings of the $2^{nd}$ World Congress of Chemical Engineering, Montreal, Canada, 6, 373 (1981). The polydispersity index (PI) is defined as $$PI = 10^5 \text{ Pa} \cdot G_c^{-1} \qquad \text{(eq. 1)}$$

with $G_c$, which is expressed in Pa, being the modulus at the intersection of the storage modulus G' and loss modulus G", i.e. $G_c$ is the modulus when G'=G". In the literature this intersection is often called "the cross-over point". Storage modulus G' and loss modulus G" can be obtained for a molten polymer sample from dynamic rheology measurement.

The propylene homopolymers of the present invention may also be used in a composition, preferably in a composition comprising other polyolefins, such as for example propylene homopolymers, which may or may not be in accordance with the present invention, propylene random copolymers, heterophasic propylene copolymers, polyethylene and the likes. In such a composition it is preferred that the propylene homopolymers of the present invention comprise at least 50 wt % of the composition.

The propylene homopolymers of the present invention may contain additives such as, by way of example, antioxidants, light stabilizers, acid scavengers, flame retardants, lubricants, antistatic additives, nucleating/clarifying agents, colorants. An overview of such additives may be found in Plastics Additives Handbook, ed. H. Zweifel, $5^{th}$ edition, 2001, Hanser Publishers.

The antioxidants used in the propylene homopolymers of the present invention preferably have anti-gas fading properties, i.e. they do not show, or only show a minimal degree of, discoloration during melt processing of the propylene homopolymers. Thus, the preferred antioxidants are selected from the group consisting of phosphites, hindered phenols, hindered amine stabilizers and hydroxylamines. An example for a suitable antioxidant additivation is a blend of Irgafos 168 and Irganox 3114. Alternatively, phenol-free antioxidant additivations are suitable as well, such as for example those based on hindered amine stabilizers, phosphites, hydroxylamines or any combination of these. In general the antioxidants are added to the propylene homopolymer in an amount from 100 ppm to 2000 ppm with the exact amount depending upon the nature of the antioxidant, the processing conditions and other factors.

The propylene homopolymers of the present invention as defined above are produced in presence of a Ziegler-Natta polymerization catalyst, an aluminium alkyl, hydrogen and an optional external donor.

A Ziegler-Natta catalyst comprises a titanium compound, which has at least one titanium-halogen bond, and an internal donor, both supported on magnesium halide in active form.

The internal donor used in the present invention is a phthalate, a diether or a blend of these. Alternatively, the internal donor may also be a mixture of a phthalate, a diether or a blend of these two with one or more other suitable internal donors, provided that the polymerization behavior of a Ziegler-Natta catalyst with such a mixture of internal donors is comparable to that of a Ziegler-Natta catalyst with a phthalate, a diether or a blend of phthalate and diether.

Alternatively to a Ziegler-Natta catalyst comprising a mixture of internal donors as described above it is also possible to employ a mixture of a phthalate catalyst or a diether catalyst and one or more Ziegler-Natta catalysts comprising an internal donor other than a phthalate or a diether, provided that such a mixture shows a polymerization behavior that is comparable to that of a pure phthalate or diether catalyst or a blend of these.

The preferred internal donor comprises at least 80 wt % of a diether, preferably at least 90 wt %, more preferably at least 95 wt % and most preferably at least 99 wt %.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Particularly suited as internal donors are 1,3-diethers of formula $R^1R^2C(CH_2OR^3)(CH_2OR^4)$ wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclopentyl-1,3-dimethoxypropane; 2-isopropyl-2-isoamyl-1,3-dimethoxypropane; 9,9-bis(methoxymethyl)fluorene.

Ziegler-Natta catalysts comprising a phthalate or a diether as internal donor are well-known in the art and are commercially available. Such catalysts can for example be obtained by reaction of an anhydrous magnesium halide with an alcohol, followed by titanation with a titanium halide and reaction with a diether compound as internal donor. Such a catalyst comprises about 2-6 wt % of titanium, about 10-20 wt % of magnesium and about 5-30 wt % of internal donor with chlorine and solvent making up the remainder.

In the polymerization process of the present invention the external electron donor (ED) is optional. It is nevertheless preferred to perform the polymerization in presence of an external electron donor (ED). Suitable external electron donors (ED) include certain silanes, ethers, esters, amines, ketones, heterocyclic compounds and blends of these. It is preferred to use a 1,3-diether as described above or a silane. It is most preferred to use silanes of the general formula $R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$Si(OCH$_3$)$_2$ (referred to as "D donor"). Preferred silanes are (cyclohexyl)(methyl) Si(OCH$_3$)$_2$ (referred to as "C donor") and (cyclopentyl)$_2$ Si(OCH$_3$)$_2$ (referred to as "D donor").

The organoaluminium compound used in the process of the present invention is triethyl aluminium (TEAL). Advantageously, the triethyl aluminium has a hydride content, expressed as AlH$_3$, of less than 1.0 wt % with respect to the triethyl aluminium. More preferably, the hydride content is less than 0.5 wt %, and most preferably the hydride content is less than 0.1 wt %. It would not depart from the scope of the invention if the organoaluminium compound contains minor amounts of other compounds of the trialkylaluminium family, such as triisobutyl aluminium, tri-n-butyl aluminium, and linear or cyclic alkyl aluminium compounds containing two or more Al atoms, provided they show polymerization behavior comparable to that of TEAL.

In the process of the present invention the molar ratio Al/Ti is not particularly specified. However, it is preferred that the molar ratio Al/Ti is at most 100.

If an external donor is present, it is preferred that the molar ratio Al/ED, with ED denoting external electron donor, is at most 120, more preferably it is in the range from 5 to 120, and most preferably in the range from 10 to 80.

Before being fed to the polymerization reactor the catalytic system preferably undergoes a premix and/or a pre-polymerization step. In the premix step, the triethyl aluminium (TEAL) and the external electron donor (ED)—if present—, which have been pre-contacted, are mixed with the Ziegler-Natta catalyst at a temperature in the range from 0° C. to 30° C., preferably in the range from 5° C. to 20° C., for up to 15 min. The mixture of TEAL, external electron donor and Ziegler-Natta catalyst is pre-polymerized with propylene at a temperature in the range from 10° C. to 100° C., preferably in the range from 10° C. to 30° C., for 1 to 30 min, preferably for 2 to 20 min.

The polymerization of propylene and one or more optional comonomers can be carried out according to known techniques. The polymerization can for example be carried out in liquid propylene as reaction medium (bulk polymerization). It can also be carried out in a diluent, such as a hydrocarbon that is inert under polymerization conditions (slurry polymerization). It can also be carried out in the gas phase.

For the present invention the propylene homopolymers are preferably produced by polymerization in liquid propylene at temperatures in the range from 20° C. to 100° C. Preferably, temperatures are in the range from 60° C. to 80° C. The pressure can be atmospheric or higher. Preferably the pressure is between 25 and 50 bar.

Hydrogen is used to control the chain lengths of the propylene polymers. For the production of propylene polymers with higher MFI, i.e. with lower average molecular weight and shorter polymer chains, the concentration of hydrogen in the polymerization medium needs to be increased. Inversely, the hydrogen concentration in the polymerization medium has to be reduced in order to produce propylene polymers with lower MFI, i.e. with higher average molecular weight and longer polymer chains.

The production process for the propylene homopolymers of the present invention comprises the step of
(a) polymerizing propylene in presence of a Ziegler-Natta polymerization catalyst, an aluminium alkyl, hydrogen and an optional external donor,
wherein the propylene homopolymer comprises at least two propylene homopolymer fractions of different melt flow index (measured according to ISO 1133, condition L, 230° C., 2.16 kg), wherein the ratio of the melt flow index of the fraction with the highest melt flow index and the melt flow index of the fraction with the lowest melt flow index is in the range from 3 to 400. Preferably, said ratio is in the range from 5 to 200, more preferably from 10 to 50, and most preferably in the range from 15 to 30.

Preferably, the propylene homopolymer produced with the production process of the present invention comprises at least two propylene homopolymer fractions of different melt flow index wherein the propylene homopolymer fraction with the lowest melt flow index has a melt flow index in the range from 1.0 dg/min to 2.5 dg/min (measured according to ISO 1133, condition L, 230° C., 2.16 kg). Preferably, said melt flow index is in the range from 1.5 dg/min to 2.0 dg/min. Most preferably, said melt flow index is in the range from 1.6 dg/min to 1.9 dg/min.

Preferably, the present propylene homopolymer comprises from 55 wt % to 65 wt %, preferably from 55 wt % to 60 wt % of the propylene homopolymer fraction with the lowest melt flow index. In other words, the contribution of the respective polymerization reactor, wherein the propylene homopolymer fraction with the lowest melt flow index is produced, with respect to the total propylene homopolymer is in the range from 55 wt % to 65 wt %, preferably from 55 wt % to 60 wt % of the propylene homopolymer.

Polymerization conditions, reactants' feed rates etc. are set in such a way as to result in the production of the propylene homopolymers with the properties mentioned above. This is well within the skills of the skilled person so that no further details need be given.

For the production of the propylene homopolymers of the present invention the polymerization is preferably carried out in at least two polymerization reactors in series, i.e. in at least two sequential polymerization reactors. More preferably, the production is carried out in two bulk polymerization reactors in series. Alternatively the production can be carried out in two reactors in series, with the first being a liquid pool reactor and the second being a gas phase reactor (GPR). Or the production can be carried out in three reactors in series, with the first and second reactor being a loop reactor and the third being a gas phase reactor (GPR).

In such a sequential arrangement of polymerization reactors the propylene homopolymer withdrawn from one reactor is transferred to the one following in the series, where the polymerization is continued. To produce propylene homopolymers of different melt flow index the polymerization conditions in the respective polymerization reactors need to be different, for example in that the hydrogen concentration in the polymerization reactors differs.

After the last of the sequential polymerization reactors the propylene homopolymer is recovered as a powder and can then be pelletized or granulated.

The propylene homopolymers of the present invention are used to produce fibers and yarns. In particular, they are used to produce staple fibers and high-tenacity yarns. These may in turn be used in the manufacture of nonwovens. The methods used in the production of the fibers and yarns as well as the nonwovens are known to the person skilled in the art and are for example described in Polypropylene Handbook, ed. Nello Pasquini, 2nd edition, Hanser, 2005, pages 397-403.

The propylene homopolymer is melted in an extruder, optionally passed through a melt pump to ensure a constant feeding rate, and then extruded through a number of fine capillaries of a spinneret, thus obtaining molten fibers. The still molten fibers (also called "filaments") are simultaneously cooled by air and melt drawn to an intermediate diameter. Subsequently they are solidified. Preferably, the solidified fibers are re-heated to a temperature of 130° C. or less, drawn to a draw ratio of at least 3, and then annealed. In a preferred mode the annealed fibers are cut to a length in the range from 1.5 mm to 200 mm, preferably in the range from 10 mm to 100 mm. Such "cut fibers" are generally referred to as "staple fibers".

Staple fibers in general are produced either by the traditional spinning process or the compact spinning process. In the traditional spinning process staple fibers are produced in two steps. The first step includes fiber production, application of a spin finish to give certain desired properties to the fibers, and winding the undrawn fiber bundle or tow. The second step includes drawing of the fibers, optional application of a second spin finish, optional crimping or texturizing and cutting into staple fibers. The compact spinning, also called short spin, process is a one-step process, wherein fiber extrusion, drawing, and optional crimping or texturizing are performed in a single step.

The staple fibers produced in accordance with the present invention may subsequently be used to produce nonwovens. Preferably the production of nonwovens comprises the steps of carding, thus forming a web, which is then passed through a bonding step. Bonding of the web can be accomplished by thermobonding, hydroentanglement, needle punching, or chemical bonding. For geotextiles and nonwovens for automotive applications needle punching is preferred.

The nonwovens of the present invention are preferably geotextiles and nonwovens for automotive applications.

The fibers and yarns produced in accordance with the present invention are characterized by improved tenacity with respect to the prior art fibers and yarns. They are also characterized by improved elongational properties. In particular, the fibers and yarns of the present invention are characterized by an improved tenacity in combination with improved elongational properties. The fibers and yarns of the present invention are characterized by a tenacity at max of 45 cN/tex or higher and an elongation at break of 55% or more, or even of 65% or more, in order to be well suited for high tenacity fibers and nonwovens.

The improved properties of the fibers and yarns can be translated into equally improved properties of the nonwovens produced with the fibers and yarns of the present invention. Thus, the nonwovens according to the present invention are characterized by improved tenacity. They are also characterized by improved elongational properties. In particular, they are characterized by the combination of improved tenacity and improved elongational properties.

The present inventors have surprisingly found that the processability of the propylene homopolymers according to the present invention is on a level with the prior art propylene homopolymers regarding spinnability but is improved with regards to the drawing, i.e. higher draw ratios can be achieved with the propylene homopolymers of the present invention.

Composites may be formed from two or more nonwovens, of which at least one is made in accordance with the present invention. Such composites may for example comprise further nonwovens, such as spunbond nonwovens (S) or melt blown nonwovens (M) or staple fiber nonwovens different from the ones of the present invention.

A first nonwoven or composite, said first nonwoven or composite being in accordance with the present invention, and a film may be combined to form a laminate. The film preferably is a polyolefin film. The laminate is formed by bringing the first nonwoven or composite and the film together and laminating them to one another for example by passing them through a pair of lamination rolls. The laminates may further include a second nonwoven or composite, which can be but need not be according to the present invention, on the face of the film opposite to that of the first nonwoven or composite. In a preferred embodiment, the film of the laminate is a breathable polyolefin film, thus resulting in a laminate with breathable properties.

The propylene homopolymers of the present invention may also be part of a composition that is used to produce fibers and nonwovens as described above. It is preferred that the propylene homopolymers of the present invention comprise at least 50 wt %, preferably at least 75 wt % and most preferably at least 90 wt % of such composition. Preferably, the other components of the composition are other polyolefins, such as for example propylene homopolymers, which may or may not be according to the present invention, propylene random copolymers, polyethylene and the likes.
Test Methods The melt flow index was measured according to norm ISO 1133, condition L, using a weight of 2.16 kg and a temperature of 230° C.

Xylene solubles (XS) were determined as follows: Between 4.5 and 5.5 g of propylene polymer were weighed into a flask and 300 ml xylene were added. The xylene was heated under stirring to reflux for 45 minutes. Stirring was continued for 15 minutes exactly without heating. The flask was then placed in a thermostated bath set to 25° C.+/−1° C. for 1 hour. The solution was filtered through Whatman no 4 filter paper and exactly 100 ml of solvent were collected. The solvent was then evaporated and the residue dried and weighed. The percentage of xylene solubles ("XS") was then calculated according to XS (in wt %)=(Weight of the residue/Initial total weight of $PP$)*300 with all weights being in the same units.

Heptane insolubles were isolated as follows: The xylene insoluble fraction (see above) was dried in air for a minimum of 3 days and manually ground into small pieces, of which ca. 2 g are weighed into the extraction thimble of a Soxleth extractor and extracted with heptane under reflux for 15 hours. The heptane insoluble fraction is recovered from the thimble, and dried in air for a minimum of 4 days.

The polymer index (PI) is given as PI=$10^5$ Pa·$G_c^{-1}$. $G_c$ is the cross-over modulus in Pascal determined at 230° C. using a dynamic rheometer in frequency sweep with a strain of 20% on an ARES from Tainstrument, branch of WATERS.

The isotacticity (mmmm %) is determined by NMR analysis according to the method described by G. J. Ray et al. in Macromolecules, vol. 10, no 4, 1977, p. 773-778. It is performed on the dried product resulting of the extraction by boiling heptane of the xylene insoluble PP fraction.

The recovery compliance is determined at 210° C. using a parallel-plate rotational stress rheometer. The sample is contained between two coaxial parallel discs in an oven filled with nitrogen. The test consists of monitoring the strain response when the stress has been deleted after a creep test. For the creep test a stress of 600 Pa is applied. Then the recovery compliance is the recoverable strain divided by the stress applied during the creep.

Fiber tenacity and elongation were measured at 23° C. on a Textechno Statimat ME according to norm ISO 5079:1995 with a testing speed of 250 mm/min.

Tensile strength and elongation of the nonwoven were measured at 23° C. according to ISO 9073-3:1989.

EXAMPLES

The advantages of the propylene homopolymers of the present invention over those of the prior art are shown in the following examples.
Propylene Homopolymers The propylene homopolymers used in the example (Ex. 1) and the comparative examples (Comp. ex. 1-4) were produced in an industrial propylene polymerization plant having two loop reactors in series. As catalyst, either a Ziegler-Natta catalyst with a phthalate as internal donor or a Ziegler-Natta catalyst with a diether as internal donor, was used as indicated in table 1. A silane was used as external donor. Further polymerization conditions, the melt flow index of the propylene homopolymer fraction produced in the first loop reactor ($MFI_1$) and the ratio of the melt flow index of the propylene homopolymer fractions produced in the first and second loop reactor ($MFI_2$(calc)/$MFI_1$) are given in table 1.

After having been recovered in form of a powder after the second loop reactor the propylene homopolymers were additivated with a sufficient amount of a blend of Irgafos 168 and Irganox 3114 in a 2:1 weight ratio and pelletized. Properties of the obtained propylene homopolymers are given in table 2.

The melt flow index ($MFI_2$) of the propylene polymer produced in the second reactor is calculated using:

$$\mathrm{Log}(MFI_{final})=w_1 \cdot \mathrm{Log}(MFI_1)+w_2 \cdot \mathrm{Log}(MFI_2),$$

wherein $MFI_1$ and $MFI_2$ are the respective melt flow indices of the propylene polymers produced in the first and the second polymerization loop reactor, and $w_1$ and $w_2$ are the respective weight fractions of the propylene polymers produced in the first and the second polymerization loop reactor as expressed in wt % of the total propylene polymer produced in the two polymerization loop reactors. These weight fractions are commonly also described as the contribution by the respective loop.

TABLE 1

| | Unit | Ex. 1 | Comp. ex. 1 | Comp. ex. 2 | Comp. ex. 3 | Comp. ex. 4 |
|---|---|---|---|---|---|---|
| Catalyst | | Di-ether | Phthal-ate | Phthal-ate | Di-ether | Di-ether |
| External Donor (ED) | | Silane | Silane | Silane | Silane | Silane |
| Catalyst Activation | | | | | | |
| TEAL/Propylene | g/kg | 0.10 | 0.20 | 0.20 | 0.16 | 0.10 |
| TEAL/ED | g/g | 20 | 65 | 27 | 150 | 21 |
| Loop 1 | | | | | | |
| Temperature | ° C. | 72 | 71 | 72 | 72 | 72 |
| Hydrogen | vpm | 400 | 645 | 750 | 780 | 850 |
| Contribution Loop1 | % | 58 | 65 | 65 | 64 | 66 |
| $MFI_1$ | dg/min | 1.70 | 6.0 | 5.8 | 6.5 | 5.9 |
| Loop 2 | | | | | | |
| Temperature | ° C. | 70 | 71 | 72 | 72 | 72 |
| Hydrogen | vpm | 3450 | 645 | 750 | 790 | 840 |
| Production | t/h | 31 | 30 | 32 | 33 | 32 |
| $MFI_2$(calc)/$MFI_1$ | | 23 | 1 | 1 | 1 | 1 |

TABLE 2

| | Unit | Ex. 1 | Comp. ex. 1 | Comp. ex. 2 | Comp. ex. 3 | Comp. ex. 4 |
|---|---|---|---|---|---|---|
| MFI | dg/min | 6.4 | 6.0 | 5.8 | 6.5 | 5.9 |
| Xs | wt % | 2.6 | 4.8 | 2.7 | 3.9 | 2.5 |
| PI | | 4.9 | 4.6 | 4.6 | 4.4 | 4.2 |
| $M_w/M_n$ | | 7.8 | 7.4 | 7.3 | 7 | 6.7 |
| mmmm | % | 97.4 | 96.7 | 97.2 | 96.6 | 97.3 |
| Recovery Compliance | $10^{-4}$ $Pa^{-1}$ | 5.1 | 5.5 | 4.4 | 3.8 | 3.4 |

Fiber Spinning

The propylene homopolymers of example 1 and comparative examples 1 to 4 were spun into fibers on a Busschaert fiber spinning pilot line equipped with two circular dies of 112 holes each of a diameter of 0.3 mm and an L/D ratio of 3.2. The melt temperature was kept at 280° C. The filaments were drawn over two godets with the temperature of the first being 80° C. and the temperature of the second being 90° C. Draw ratio was between 3 and 5. The targeted fiber titer was in the range from 5 to 7 dtex per filament. This was achieved by keeping the winder speed after the drawing step at a constant speed of 1200 m/min and adapting the take-up speed, i.e. the speed at which the fibers are collected directly after melt spinning. The respective draw ratios and the fiber properties are indicated in table 3.

TABLE 3

|  | Unit | Ex. 1 | Comp. ex. 1 | Comp. ex. 2 | Comp. ex. 3 | Comp. ex. 4 |
| --- | --- | --- | --- | --- | --- | --- |
| Max. draw ratio | dtex | 4.8 | 4.0 | 4.2 | 4.0 | 4.0 |
| Tenacity at max | cN/tex | 57 | 48 | 49 | 46 | 48 |
| Elongation at break | % | 73 | 59 | 68 | 65 | 67 |

Example 1 clearly shows the advantages of the propylene homopolymer of the present invention. The propylene homopolymer of the present invention allowed to draw the fibers at a much higher draw ratio that any of the comparative propylene homopolymers. This higher draw ratio resulted in an increase in tenacity at max. of at least 15%. Most surprising the increase in tenacity is not accompanied by a loss in elongational properties but the propylene homopolymer of the present invention rather shows an increase on the order of 7%.

In conclusion it was found that the propylene polymers of the present invention allow the production of fibers with the desired combination of tenacity and elongational properties.

The invention claimed is:

1. A propylene homopolymer comprising at least two propylene homopolymer fractions of different melt flow index, wherein a ratio of the melt flow index of the fraction with the highest melt flow index and the melt-flow index of the fraction with the lowest melt flow index is in the range from 3 to 400, said propylene homopolymer having
a melt flow index in the range from 3.0 to 8.0 dg/min,
a xylene solubles content in the range from 1.5 wt % to 3.5 wt %,
a tacticity in the range from 97.0% to 99.0% of mmmm pentads (determined on the insoluble heptane fraction of the xylene insolubles fraction), and
a recovery compliance in the range from $4.0 \cdot 10^{-4}$ $Pa^{-1}$ to $5.5 \cdot 10^{-4}$ $Pa^{-1}$,
with melt flow index determined according to ISO 1133, condition L, at 230° C. and 2.16 kg,
wherein the propylene homopolymer is in a solid form.

2. The propylene homopolymer according to claim 1, wherein the ratio of the melt flow index of the fraction with the highest melt flow index and the melt flow index of the fraction with the lowest melt flow index is in the range from 5 to 200.

3. The propylene homopolymer according to claim 1, wherein the at least two propylene homopolymer fractions, when taken together, comprise at least 90.0 wt % of the propylene homopolymer.

4. The propylene homopolymer according to claim 1, wherein the propylene homopolymer fraction with the lowest melt flow index has a melt flow index in the range from 1.0 dg/min to 2.5 dg/min.

5. The propylene homopolymer according to claim 1, wherein the propylene homopolymer fraction with the lowest melt flow index comprises from 55 wt % to 65 wt % of the propylene homopolymer.

6. The propylene homopolymer according to claim 1, having a polydispersity index in the range from 4.0 to 5.5.

7. Fibers or yarns comprising the propylene homopolymer of claim 1.

8. Nonwovens comprising the fibers of claim 7.

9. A process for the production of propylene homopolymer comprising
(a) polymerizing propylene in presence of a Ziegler-Natta polymerization catalyst, an aluminium alkyl, hydrogen and an optional external donor to produce a propylene homopolymer having a recovery compliance in the range from $4.0 \cdot 10^{-4}$ $Pa^{-1}$ to $5.5 \cdot 10^{-4}$ $Pa^{-1}$,
wherein the propylene homopolymer comprises at least two propylene homopolymer fractions of different melt flow index (measured according to ISO 1133, condition L, 230° C., 2.16 kg), wherein a ratio of the melt flow index of the fraction with the highest melt flow index and the melt flow index of the fraction with the lowest melt flow index is in the range from 3 to 400.

10. The process according to claim 9, wherein the propylene homopolymer fraction with the lowest melt flow index has a melt flow index (measured according to ISO 1133, condition L, 230° C., 2.16 kg) in the range from 1.0 dg/min to 2.5 dg/min.

11. The process according to claim 9, wherein the Ziegler-Natta polymerization catalyst has an internal electron donor that comprises at least 80 wt % of a diether.

12. The process according to claim 9, wherein the external donor is a silane.

13. The process according to claim 9, further comprising:
(b) melting the propylene homopolymer obtained in step (a) in an extruder,
(c) extruding the molten propylene homopolymer of step (b) from a number of fine capillaries of a spinneret, thus obtaining molten fibers, and
(d) subsequently solidifying the fibers of step (c).

14. The process according to claim 13, further comprising:
(e) re-heating the solidified fibers of step (d) to a temperature of 130° C. or less,
(f) drawing said re-heated fibers of step (e) with a draw ratio of at least 3, and
(g) annealing said drawn fibers obtained in step (f).

15. The process according to claim 14, further comprising
(h) producing a nonwoven with the drawn fibers of step (g).

16. The process according to claim 9, wherein the propylene homopolymer has
a melt flow index in the range from 3.0 to 8.0 dg/min,
a xylene solubles content in the range from 1.5 wt % to 3.5 wt %,
a tacticity in the range from 97.0% to 99.0% of mmmm pentads (determined on the insoluble heptane fraction of the xylene insolubles fraction), and
with melt flow index determined according to ISO 1133, condition L, at 230° C. and 2.16 kg.

17. The propylene homopolymer according to claim 1, wherein the ratio of the melt flow index of the fraction with the highest melt flow index and the melt flow index of the fraction with the lowest melt flow index is in the range 10 to 50.

18. The propylene homopolymer according to claim 1, wherein the propylene homopolymer fraction with the lowest melt flow index has a melt flow index in the range from 1.5 dg/min to 2.0 dg/min.

19. The propylene homopolymer according to claim 1, wherein the propylene homopolymer comprises at least 95 wt. % of the at least two homopolymers.

20. The propylene homopolymer according to claim 9, wherein the produced propylene homopolymer consists essentially of the at least two homopolymers.

21. The propylene homopolymer according to claim 9, wherein the produced propylene homopolymer comprises at least 95 wt. % of the at least two propylene homopolymer fractions.

* * * * *